Aug. 3, 1948.                R. E. SHRADER                2,446,248
                            PHOSPHOR SCREEN
                          Filed June 13, 1946
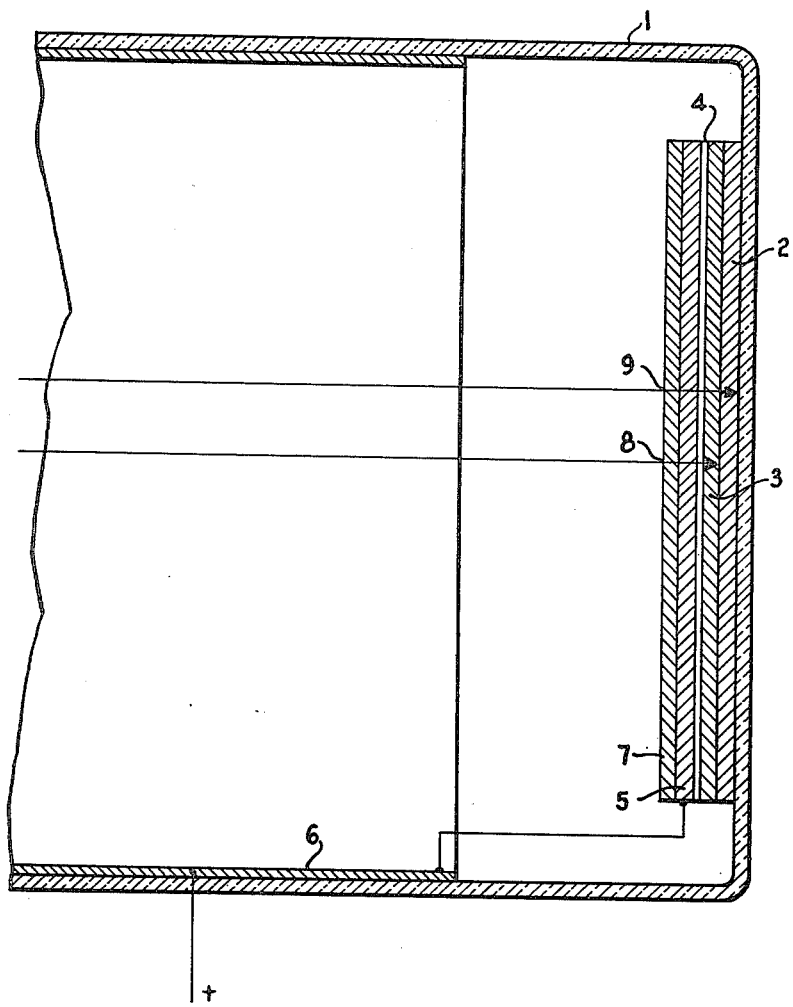
INVENTOR
Ross E. Shrader
BY
William A. Zalesak
ATTORNEY Patented Aug. 3, 1948

2,446,248

UNITED STATES PATENT OFFICE 2,446,248

PHOSPHOR SCREEN

Ross E. Shrader, Princeton, N. J., assignor to Radio Corporation of America, a corporation of Delaware Application June 13, 1946, Serial No. 676,458

2 Claims. (Cl. 250—164)

This invention relates to phosphor screens for position-locating devices, such as radar tubes.

In radar tubes the signals reflected from a distant object produce pulses which modulate the cathode ray beam of a tube. The beam produces flashes as it scans the screen. These flashes or "pips" show the relative location of the object. The reflected signals, particularly over land, may contain echoes from various fixed objects, such as mountains, trees, etc., as well as an echo from a moving object, such as an airplane, the position of which is to be determined. It is difficult to distinguish the moving pips on the screen from the stationary ones by the movement alone and various suggestions have been made for causing the phosphor to flash a different color when produced by a moving object.

It is an object of this invention to provide an improved arrangement for changing the color of the flash when an echo is received from a moving object.

Another object is to provide a layer of poor secondary emitting property in front of the two phosphor layers, so that new information on elemental areas, indicating moving objects, will accumulate less charge than repeated information from fixed objects, which determines the depth of penetration and the color of the emitted light.

Other objects of the invention will appear in the following specification, reference being had to the drawing, in which the single figure illustrates a cathode ray tube containing the invention.

Referring to the drawing, the evacuated envelope 1 contains the target, comprising a plurality of phosphor layers. The phosphor layer 2 may consist of zinc cadmium sulphides and activators having, by way of example, the following composition: ZnS 93%, CdS 7%, Ag 0.006%, Cu 0.005%, the percentages being based on weight, the weight of Ag and Cu calculated on the basis of ZnS+CdS as 100%. From 5 to 10 milligrams per square centimeter of area will be suitable. This layer, when struck by the beam electrons, produces green or blue-green light. On this layer is placed a layer 3 of about the same thickness of a phosphor adapted to produce a different color, such as red or orange. This may be zinc fluoride with manganese activator, or zinc cadmium sulphide with a suitable composition, ZnS 70%, CdS 30%, with Cu 0.006% activator, calculated as above stated. Upon layer 3 is floated a thin film 4 of collodion. Upon this layer of collodion is evaporated a semi-transparent film 5 of metal, such as aluminum, and this is connected to the wall coating anode 6 for accelerating the beam electrons into the phosphors. The layer of collodion is used merely to form a smoother layer for condensing the aluminum film 5. Finally, upon the film 5 is evaporated a layer 7 of quartz of 0.01 to .1 micron thickness to provide a layer of poor secondary emitting properties.

In the drawing the layer thickness has been exaggerated for purposes of illustration and the complete tube is not shown. The invention is not dependent upon any particular type of gun, deflecting means and focusing arrangement, so these are not illustrated.

The operation of my improved target is as follows:

When the beam strikes, as at 8, on an area while receiving repeated information, as echoes from a fixed object, it finds the area relatively highly negatively charged, because the electrons have landed on the quartz layer 7 during each scansion with relatively small secondary electron emission, quartz being a poor secondary emitter. The accelerating positive voltage of layer 5 is opposed by the negative voltage produced by the heavy charge and the beam electrons succeed in penetrating only into the "red" layer 3. The location of the fixed object is thus signalled by a red flash and red phosphorescent decay. If an echo from a moving object is received when the beam strikes an elemental area, as at 9, this area having no recent information, any previous charge has largely leaked off. Almost the full accelerating voltage of layer 5 is applied and the beam electrons strike both layers 2 and 3. The light from these two layers thus flashes substantially white from the combination of the red light and blue-green, with an effective phosphorescent decay color of blue or green due to the shorter decay time of the red phosphor.

I claim:

1. A phosphor screen comprising a phosphor adapted to emit light of one color, a phosphor adapted to emit light of another color, a conducting layer on the last-mentioned phosphor connected to a positive potential electrode and a layer of poor secondary emitting property on said conducting layer adapted to control the depth of electron penetration into said phosphors by the charge produced thereon by electron bombardment of the beam electrons.

2. A phosphor screen comprising a phosphor adapted to emit red light, a phosphor adapted to emit blue-green light, a conducting layer on the last-mentioned phosphor connected to a positive potential electrode and a layer of poor secondary emitting property on said conducting layer adapted to control the depth of the electron penetration into said phosphors by the charge produced thereon by electron bombardment of the beam electrons.

ROSS E. SHRADER.